June 8, 1965  G. H. DOWTY ETAL  3,188,023
WHEEL MOUNTINGS FOR AIRCRAFT UNDERCARRIAGES OR OTHER VEHICLES
Filed Sept. 15, 1961  3 Sheets-Sheet 3

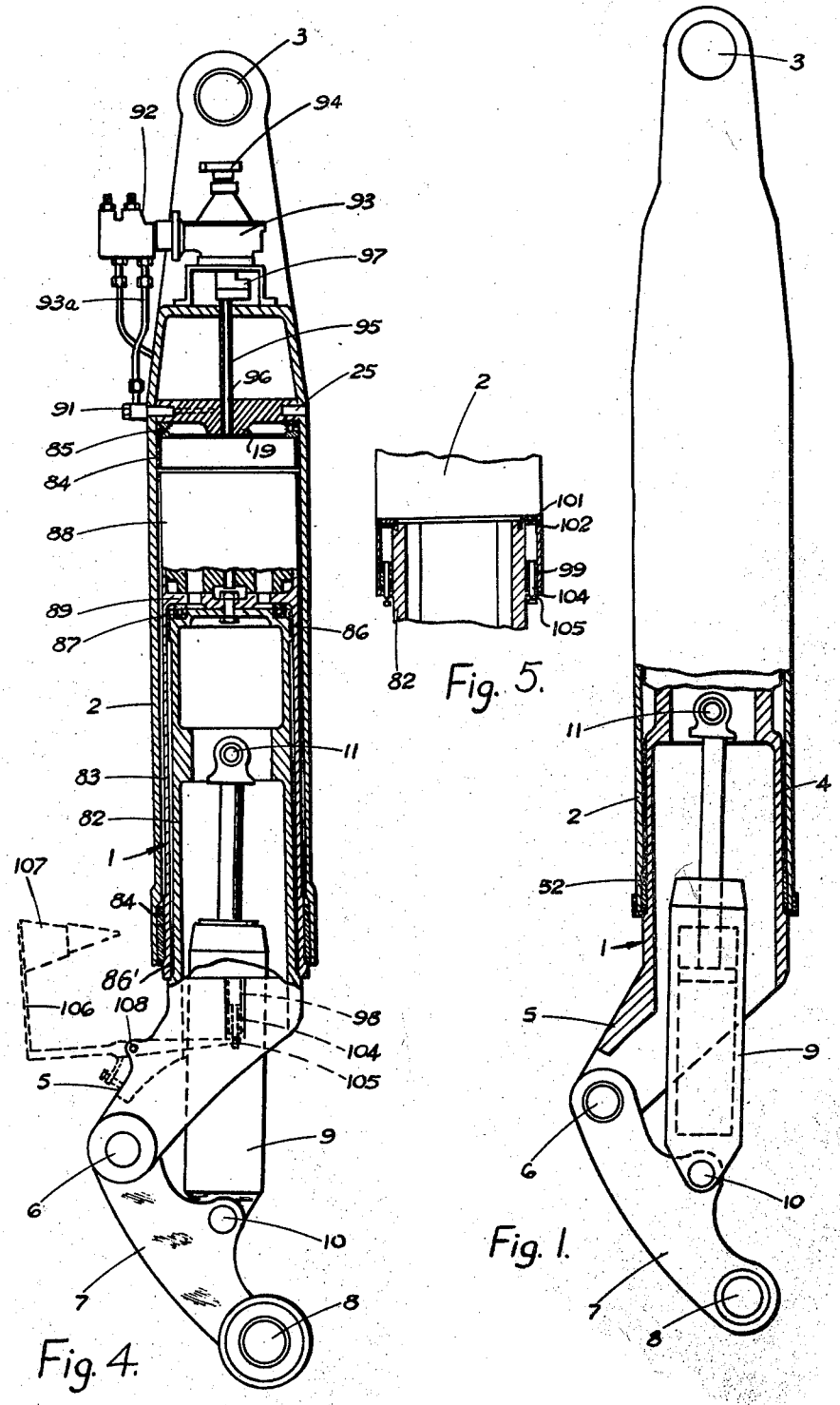

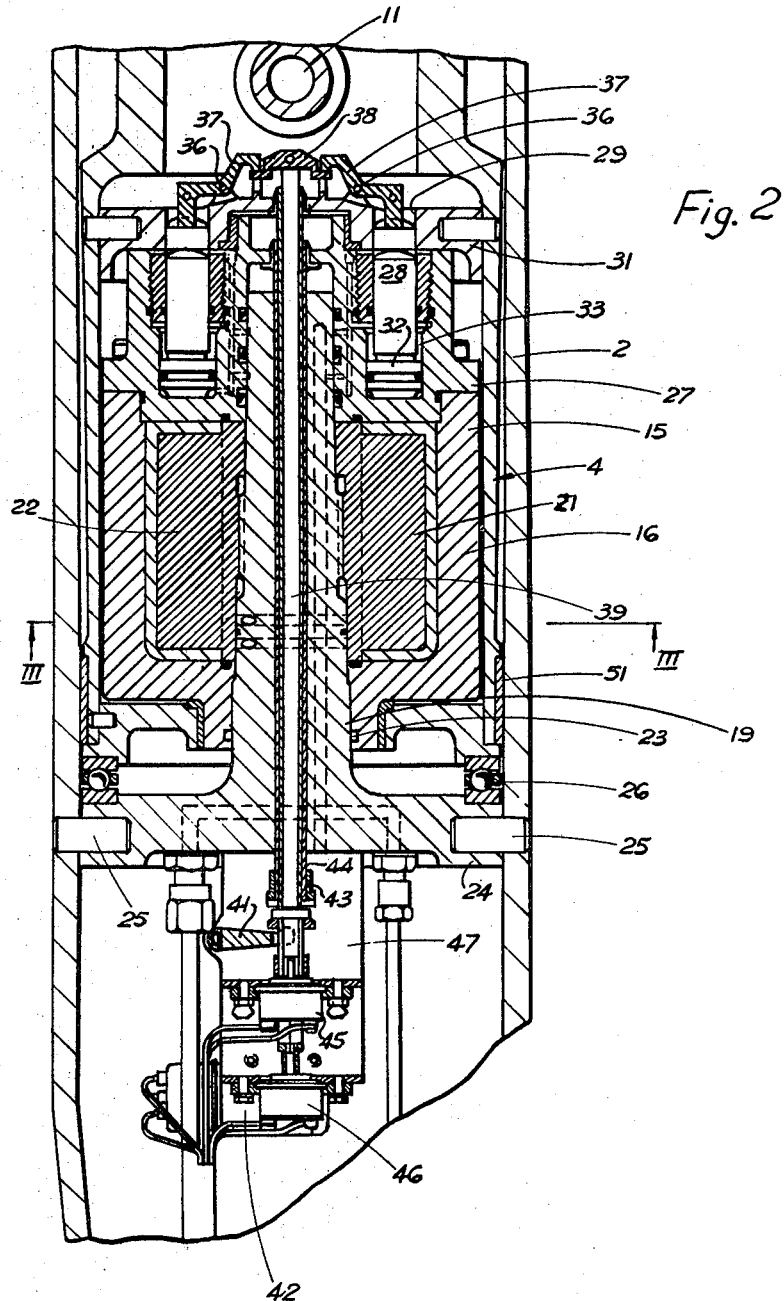

United States Patent Office 3,188,023
Patented June 8, 1965

3,188,023
WHEEL MOUNTINGS FOR AIRCRAFT UNDER-
CARRIAGES OR OTHER VEHICLES
George H. Dowty, Cheltenham, Clifford W. Tinson, St.
Mark's, Cheltenham, Robert C. Eeles, Cheltenham,
and Thomas Desmond Hudson Andrews, Leckhampton Hill, Cheltenham, England, assignors to Dowty
Technical Developments Limited, Brockhampton
Park, England
Filed Sept. 15, 1961, Ser. No. 138,379
Claims priority, application Great Britain, Sept. 17, 1960,
32,066/60; Oct. 1, 1960, 33,781/60; Dec. 24, 1960,
44,368/60
2 Claims. (Cl. 244—50)

This invention relates to steerable wheel mountings suitable for aircraft undercarriages. The main object of this invention is to provide a simple and compact wheel mounting particularly although not exclusively intended for use as part of an aircraft undercarriage.

In accordance with the present invention a steerable wheel mounting suitable for an aircraft is formed by a unit comprising a rotary actuator for steering secured substantially co-axially to a suspension. The unit may be co-axially located in a tubular strut adapted for fixed securing in a substantially vertical position from the aircraft. For the purpose of this specification a rotary actuator is defined as a fluid pressure device having a rotary vane or vanes movable under fluid pressure angularly about an axis. Also for the purpose of this specification a suspension is defined as a spring device suitable for interposing between a vehicle or aircraft and a ground engaging wheel to support the vehicle or aircraft resiliently. A suspension may also include a shock absorber. Where the wheel mounting is for use on an aircraft as a nosewheel mounting the rotary actuator may be adapted for disconnection to permit free movement of the wheel about the actuator axis to facilitate castoring. Where the suspension comprises an elongated cylindrical device and enclosing an elastic fluid, the rotary actuator may be of annular form surrounding the suspension.

Figure 6:
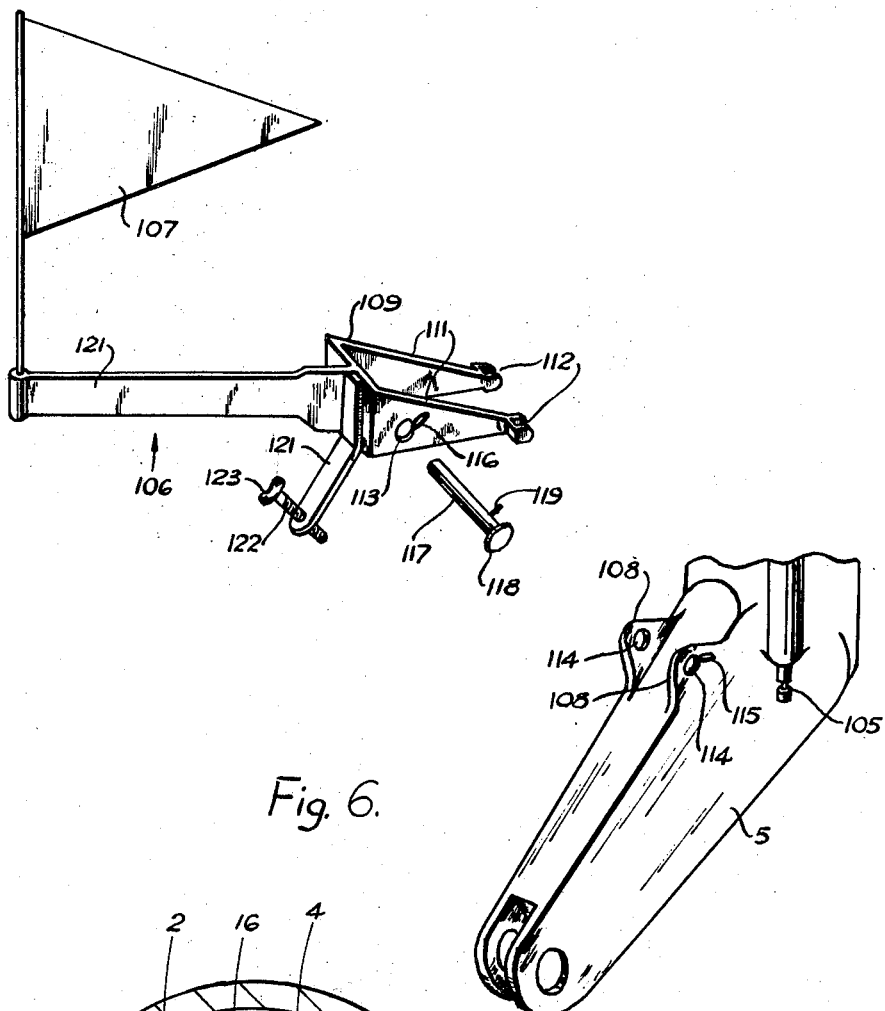
Figure 3:
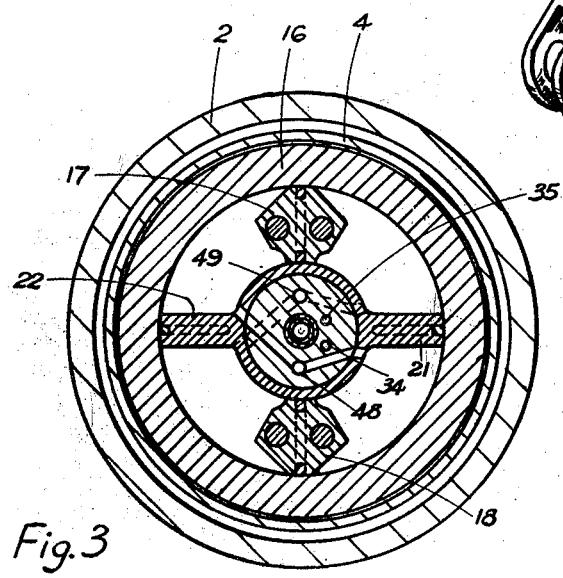

Two examples of the invention for use as a steerable nosewheel mounting for aircraft will now be described with reference to the accompanying drawings in which, FIGURE 1 is a longitudinal cross-section through the first example, FIGURE 2 is an enlarged inverted cross-sectional view of the steering motor used in FIGURE 1, FIGURE 3 is a cross-section taken on the line III—III of FIGURE 2, FIGURE 4 is a longitudinal cross-section of the second example, FIGURE 5 is an enlarged cross-section of the means to disengage the steering motor of FIGURE 4, and FIGURE 6 is an illustration of a tool for use in the example of FIGURE 4 to disengage the steering motor.

Initially reference is made to FIGURES 1, 2, and 3 of the accompanying drawings. The combined steering and suspension unit 1 has its upper end enclosed within the lower part of a tubular strut 2 which extends upwardly into the aircraft and is secured thereto by a pivot 3 about which the whole undercarriage may be moved for retraction. The means for retraction is not illustrated since it forms no part of the present invention. The steering and suspension unit 1 includes an outer casing 4 of hollow cylindrical form which at its lower end is integrally formed with a lug 5 having a pivot pin 6 from which the lever 7 extends across the axis of the casing 4 having at its opposite end an axle mounting 8 for a pair of ground engaging wheels. A liquid spring 9 of conventional form forms the suspension and is secured at its lower end to pivot 10 on the lever 7 and at its upper end is secured to a pivot 11 located within the casing 4. A rotary actuator 15 is located in the upper part of the casing 4 and is used to rotate the whole unit 1 about the axis of the tubular strut 2, for steering purposes. The rotary actuator 15 comprises a thick walled cylinder 16 having a pair of internal vanes 17 and 18 secured thereto, a fixed central spindle 19 extending through the cylinder 16 in sealed relation thereto and a pair of vanes 21 and 22 extending from the central spindle 19 into sealing engagement with the interior of the cylinder 16. In this way between the four vanes 17, 18, 21 and 22 four hydraulic working spaces are provided. The fixed spindle 19 extends from the upper end of the cylinder 16 through a seal 23 above which the spindle is integrally formed with a disc 24 which is an accurate fit within the tube 2. Disc 24 is secured to the tube 2 by means of pins 25 extending through the tube into the disc. Apart from locating the central spindle 19 the disc 24 serves to transfer the weight of the aircraft from the tube through the thrust bearing 26 to the upper end of the casing 4.

The cylinder 16 of the rotary actuator is rotatably mounted in the casing 4 and the lower end plate 27 of cylinder 16 is provided with a plurality of axially directed locking pins 28 which are engageable in the holes 29 formed within a plate 31 secured within casing 4. Each pin 28 has a piston 32 secured thereto at its inner end arranged for sliding movement within a cylinder 33. A pair of liquid flow passages 34 and 35 extending through the spindle 19 from the upper end thereof make hydraulic connection with the upper and lower ends of the cylinder 33 to facilitate movement of the pins 28. The lower side of the plate 31 includes adjacent to each hole 29 a pivot point 36 on which a bell crank lever 37 is located so as to be moved by the pin 28 when it projects into the hole 29. The bell crank levers 37 are arranged to make contact with a central disc 38 carried by a rod 39 which extends axially through the spindle 19, being adapted at its upper end to operate pivoted lever 41 which in turn is mechanically connected for operation of a switch 42. A pair of tubes 43 and 44 extend through the spindle 19 co-axially around the rod 39 and the upper ends of these tubes are connected respectively for the actuation of a pair of electrical position responsive devices 45 and 46 respectively. These devices 45 and 46 together with the switch 42 are mounted on a bracket 47 secured to the plate 24. The tubes 43 and 44 at their lower ends are respectively secured to the flange 31 and to the lower plate 27 of cylinder 16. For the supply of hydraulic liquid to the working spaces within the rotary actuator 15 a further pair of passages 48 and 49 are provided within the central spindle 19 and at a position within the cylinder 16 each of these passages is connected to a diametrically opposed pair of the working spaces.

When the undercarriage as described is in use on an aircraft and is arranged to permit free castoring movement of the wheels carried by the casing 4, hydraulic pressure is supplied to the lower end of the cylinders 33 to hold all pins 28 withdrawn from their co-operating holes 29. In this way the casing 4 is entirely disconnected from the rotary actuator and is capable of completely free rotational movement about the axis of the tube 2 by means of the thrust bearing 26 and the plain bearings 51, 52 within the lower end of tube 2. In the event that the pilot wishes to steer the nosewheel he operates a control to supply hydraulic pressure to the upper end of the cylinders 33 causing the pins 28 to be urged outwardly to make contact with the flange 31. The position responsive devices 45 and 46 control an electro hydraulic valve (not shown) controlling the supply of hydraulic fluid to the passages 48 and 49 to cause rotation of the actuator cylinder 16 relative to the fixed spindle 19 to a position where pins 28 are adjacent to their co-operating holes 29. In this position the pins then move into these holes to lock the cylinder 16 to the casing 4 and at the same time to move the bell crank lever 37 to cause axial movement of the rod 39 and operation of switch 42. The switch 42 will cause switching of the position responsive elements 45 and 46 to transfer control of the electro hydraulic valve to a steering control operable by the pilot.

Reference is now made to FIGURE 4 of the accompanying drawings to illustrate the second example of the invention. This example has a close resemblance to the example of FIGURE 1 and where possible similar reference numerals will be used. A tubular strut 2 is adapted for securing to the aircraft by means of a hollow pivot pin 3 about which it is retractable into the aircraft. Means not shown are provided for securing the strut 2 in a downward direction about the pivot pin 3. Within the tubular strut 2 the steering and suspension unit is mounted and there extends from the lower end of the strut 2 the lug 5 to which a suspension lever 7 is pivotally connected. A liquid spring 9 forming the suspension is pivotally secured to the lever 7 at pivot point 10 whilst at the opposite end of the lever to the pivot 6 the wheel axle 8 is located. The arrangement is such that the lever can pivot in a plane containing the axis of the strut 2 and the liquid spring is arranged for substantially vertical spring movement into or out of the lower end of strut 2. Within the strut 2 the unit 1 is of slightly different construction from that illustrated in FIGURE 1. The lug 5 is now carried by an inner rotary member 82 within which is located the pivot pin 11 for the upper end of the liquid spring 9. The rotary member 82 is carried within the lower end of a cylindrical casing 83 which is mounted for rotary movement within the strut by means of sleeve bearings 84 and ball-thrust bearing 85. The rotary member 82 is mounted for rotation within the lower end of the cylindrical casing 83 by means of sleeve bearings 86, 86' and thrust bearing 87. Within the upper end of the cylindrical casing 83 a rotary actuator 88 is located, whose construction is substantially identical with that disclosed with reference to FIGURES 2 and 3, with the exception that the cylindrical casing of the actuator is permanently fixed to the cylindrical casing 83 at an inner transverse wall 89. This transverse wall 89 conveniently forms a reaction member with which thrust bearing 87 co-operates. As in FIGURES 2 and 3 a fixed spindle 19 extends from the upper end of the rotary actuator and is integrally formed with a flange 24 fixedly secured within the tubular strut 2 by means of pins 25. In this instance, hydraulic connections for operation of the rotary actuator are taken through pipe connections extending through the tubular strut 2 into the disc 24, such a pipe connection being indicated at 91. For the supply of hydraulic pressure to the rotary actuator 88, the three position hydraulic valve 92 is provided, capable of supplying hydraulic pressure in one direction or the other to the actuator 88 or of entirely closing the connections 93a. Valve 92 is actuated by a differential gear unit 93 in response to the error between a mechanical input movement from the pilot's cabin supplied to the mechanical connection 94 of the differential box 93 and a mechanical drive from the cylindrical casing 83 fed through a tube 95 extending through a bore 96 within spindle 19 to a mechanical input connection 97 of the differential gear 93. The method of controlling steering of the nosewheel by a mechanical differential gear responding to the error between the pilot's control and the steering movement of the nosewheel is quite conventional and for this reason details of differential gear 93 and the valve 92 do not need to be disclosed further.

This means by which rotary drive is transferred from the cylindrical casing 83 to the rotary member 82 is illustrated more particularly in FIGURE 5. The rotary member 82 at the position where it projects from the lower end of the strut 2 is provided with a pair of spring loaded plungers 98, loaded by springs 99 to engage in co-operating holes 101 formed in the flange 102 at the lower end of cylindrical casing 83. Rods 104 project downwardly from the plungers 98 and are grooved at 105 for the reception of a disengaging tool which is illustrated more particularly in the FIGURE 8, although it is shown by reference 106 in FIGURE 6. The tool is adapted to be secured to the lug 5 by means of a projection 108 thereon and when in position engages in the groove 105 to withdraw the plungers 98 so that the rotary member 82 may move relatively to the cylindrical casing 83. The tool 106 may carry a pennant 107 so that the presence of the tool in its operative position may be easily appreciated. The use of the plungers 98 is solely intended to facilitate ground handling the aircraft and when the aircraft is preparing for flight, the tool 106 should be removed from position. The structure of the tool and of the plungers is such that the tool cannot be removed until the plungers 98 have engaged in their recesses 101 in the cylindrical casing. In preparing for take-off it is necessary for the ground crew to move the wheels about the steering axis until they come within the normal steering range of the aircraft. The pilot may then operate his steering control within the aircraft to cause movement of the rotary actuator and corresponding movement of the cylindrical casing 83 until the holes 101 are engaged by the pins 98. In this condition the tool 106 may be removed.

The tool 106 is illustrated more particularly in FIGURE 6 and comprises a forked base member 109 having a pair of arms 111 adapted to fit on either side of the lug 5 of unit 1 over the projections 108. The free ends 112 of the arms 111 are bifurcated to engage around the grooves 105 of plungers 98. The arms each include a hole 113 capable of alignment with the corresponding holes 114 in the projections 108. One projection 108 includes a radial slot 115 whilst the corresponding hole 113 also includes a radial slot 116. To locate the tool in position it is placed over the lug 5 so that the bifurcated ends 112 engage in the grooves 105 of plungers 98. A pin 117 having a head 118 is then inserted through the holes 113 and 114 to pivotally locate the tool in position. The pin 117 includes a head 118 and a radial projection 119 capable of fitting in the slots 115 and 116. When the pin 117 is initially inserted the projection 119 passes through the slot 116 and settles in the slot 115. When upward force is applied to the pennant carrying arm 121 of the tool the plungers 98 are pulled downwardly to withdraw them from the holes 101 thus unlocking the rotary member 82 from the cylindrical casing 83. To retain the plungers 98 in this withdrawn position there is provided on the tool 106 a projection 120 through the end of which a quick pitch screw threaded bolt 122 is located, this bolt having a butterfly head 123 for manual operation. When the end 121 of the tool is raised to withdraw the plungers 98 the screw 123 is screwed inwardly to engage the lug 5 and so to hold the plungers in their withdrawn position. The angular movement of the tool also causes the slot 116 to become disaligned from the slot 115 so that the projection 119 is trapped within the slot 116 and the pin cannot be removed. For re-engagement of the plungers 98 the nosewheel is rotated about its castor axis until it is in a position within the steering range. The screw 122 is then released to permit the springs 99 of plungers 98 to tend to push the plungers into their holes 101. The pilot of the aircraft will then operate his steering control to cause the steering motor 88 to rotate rotary member 82 until the holes 101 are aligned with the plungers 98 and they may engage under spring force. When this happens tool 106 will move angularly so that the slots 116 become aligned and the pin 117 may then be removed to release the tool from its operative position.

We claim as our invention:
1. A steerable undercarriage wheel mounting, including a hollow tubular outer strut having means at its upper end for attachment to an airframe of an aircraft, a hollow inner strut mounted for rotation within the outer strut, two vertically spaced journal bearings for said inner strut and carried by said outer strut, an axle mounting assembly connected to the lower end of said inner strut, a rotary vane-type fluid motor mounted within the outer strut, and having a casing part and a rotor part mounted for relative rotation on an axis coincident with the rotary axis of the inner strut, clutch means for connecting one of said motor parts to one of said struts, and means for connecting the other motor part to the other strut, a resilient damping suspension device connected at its lower end to the axle mounting assembly, and connected at its upper end to a horizontal pivot pin rigidly secured to the inner strut, and a thrust bearing acting between said inner and outer struts to transfer the vertical thrust of said suspension device to said airframe.

2. A steerable undercarriage wheel mounting as claimed in claim 1, in which the inner rotor part of said motor is connected to a spindle which extends upwards from the motor casing through a fluid seal, and is rigidly secured to a fixed transverse horizontal disc within the outer strut.

References Cited by the Examiner
UNITED STATES PATENTS

| | | | |
|---|---|---|---|
| 2,652,214 | 9/53 | Cussons | 244—50 |
| 2,943,819 | 7/60 | Orloff et al. | 244—50 |
| 2,974,906 | 3/61 | Hrusch | 244—50 |

MILTON BUCHLER, *Primary Examiner.*